UNITED STATES PATENT OFFICE.

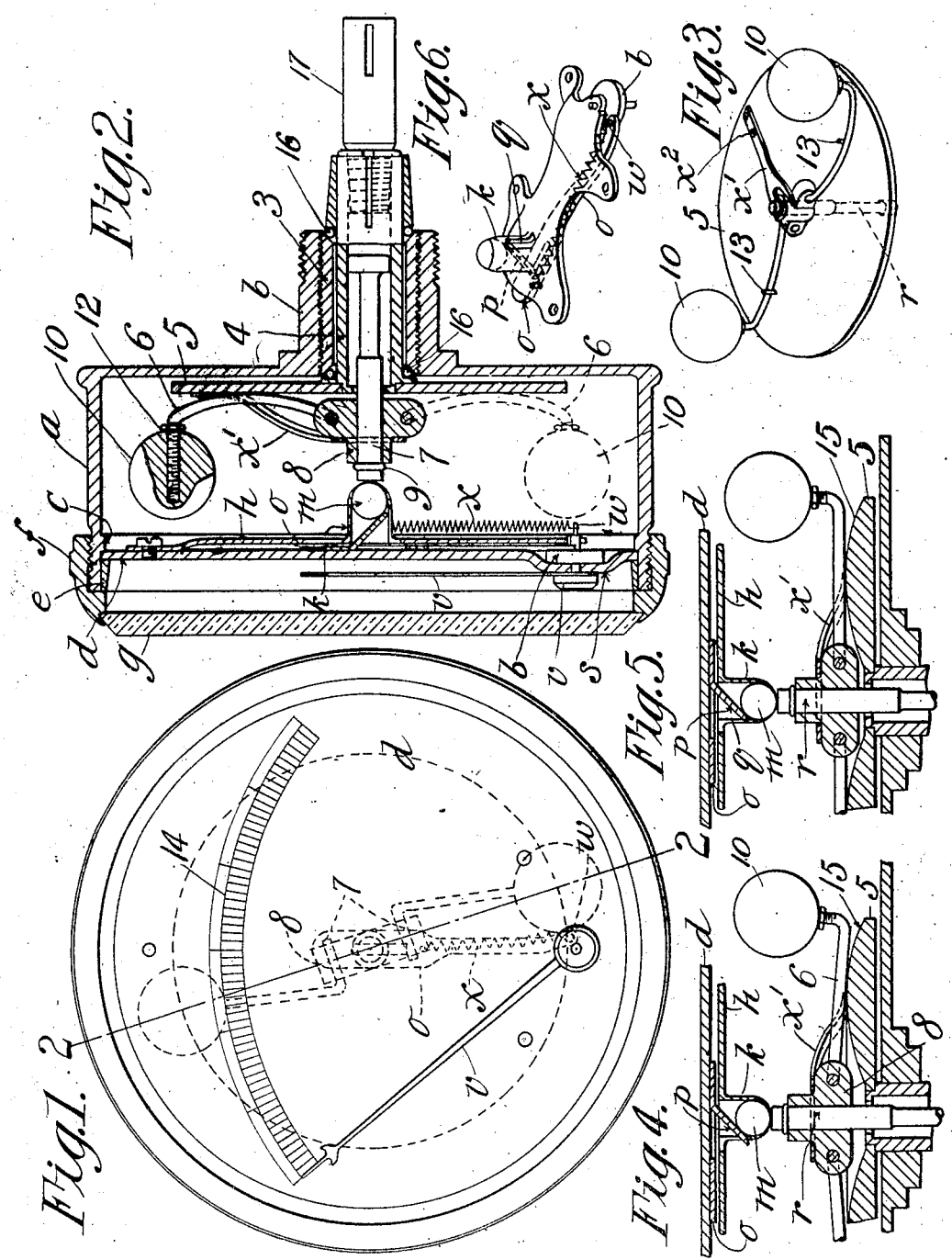

JAMES H. BULLARD, OF SPRINGFIELD, MASSACHUSETTS.

SPEEDOMETER.

No. 925,992.  Specification of Letters Patent.  Patented June 22, 1909.

Application filed January 18, 1908. Serial No. 411,412.

*To all whom it may concern:*

Be it known that I, JAMES H. BULLARD, a citizen of the United States of America, residing at Springfield, in the county of Hampden and State of Massachusetts, have invented new and useful Improvements in Speedometers, of which the following is a specification.

This invention relates to speedometers of the centrifugally actuated type of that class whereby the circumferential speed of a rotating element is indicated on a suitably graduated dial by a pointer movable over the same by the speedometer mechanism; and to more clearly define the invention it may be stated that it is of that type in which the centrifugal action of the rotating elements of the mechanism results in a constant change of the plane of rotation of those parts of the device which actuate the indicating pointer, said change taking place according as the speed of rotation increases or diminishes. This characteristic distinguishes this type from that in which the indicating pointer is actuated by the separation of the parts rotating always in the same plane.

The object of the invention is to provide a mechanism of the character described whereby under varying speeds of rotation the movement of the pointer over the scale will always bear the same ratio to the speed of rotation of the parts which actuate it whether that speed be low or high.

The invention is fully illustrated in the accompanying drawings in which—

Figure 1 is a plan view of the face of a speedometer embodying the invention, certain parts being shown in dotted lines. Fig. 2 is a sectional view longitudinally of the axis of rotation of the parts, the plane of the section being taken on line 2—2, Fig. 1. Fig. 3 is a perspective view of the centrifugally actuated weighted arms of the device, and the support therefor on which the arms fulcrum. Figs. 4 and 5 are sectional views in the same plane as Fig. 2, showing a modified construction of parts of the rotating weighted arms and the support therefor, these figures showing the same parts in different positions. Fig. 6 is a perspective view of certain parts of the mechanism actuated by the centrifugal action of the weighted rotating arms to move the indicating pointer.

Referring now to these drawings, *a* indicates the case of the instrument which is in the form of a shallow cup open at one side and having an axially located hub *b* on the closed side thereof. Near the edge of the open side of the case a bead *c* is turned up on the inside thereof to support a dial plate *d* which is held in position by means of a ring *e* held securely against the edge of the plate by a screw-cap comprising the metal ring *f* and a glass face *g*.

On the under side of the dial plate *d* is secured a metal bridge-plate *h*, (shown in Fig. 3 in perspective and in section in Figs. 2, 4, and 5) which has struck up therefrom or affixed thereto the hub *k* which, when the plate is in position, will be located axially in line with the axis of the hub *b* on the case; and in this hub *k* is a ball *m* which may play freely therein and is held in the hub by "spinning" over the open end of the latter to contract it slightly.

When the bridge-plate *h* is in position on the under side of the dial-plate *d*, space is provided between the two for the slidable arm *o* having a tongue *p*, preferably struck up therefrom, and of such dimension as to lie within the hub *k* at an angle of about 45 degrees, the side of the hub *k* having a vertically disposed opening *q* therein to permit this tongue to move through it when, by pressure applied on the ball *m*, the latter is forced against the inclined tongue *p* to impart endwise movement to the slidable member *o*, such movement of the ball *m* being effected by the endwise movement of the axially located spindle *r* in a manner to be described.

At the proper point on the dial plate *d* a depression *s* is struck up therein from the under side thereof to receive the hub *t* of the indicating pointer *v*; and, as shown in Fig. 4, eccentrically of this hub is a pin *w* with which the end of the sliding member *o* engages, whereby endwise movement of the slide toward and from the hub *t* will impart a swinging movement to the indicating pointer over the face of the dial. The pin *w* is made long enough so that its free end will extend beyond the bridge-plate *h*, and to the upper end of this pin a spring *x* is attached whose opposite end is secured to another pin on the bridge-plate, the spring being normally under slight tension to the end that the tongue *p* on the arm *o* may always press the ball *m* toward or against the end of the spindle *r*; and this pressure being in a direction contrary to the direction of movement of the spindle when it actuates the pointer, all possibility of "play" of the pointer is therefore eliminated when the instrument is in operation. If desired, another spring $x^1$ may be secured to the support 5, its end being forked to bear on the yoke 8, as shown, this spring being adjustable by means of the screws $x^2$ which secure it to said support 5.

The construction of the devices whereby movement is imparted to the indicating pointer is as follows: In the hub $b$ of the casing is screwed a sleeve 3, each end of which is inwardly beveled, as shown in Fig. 2; and within this sleeve is a hollow hub 4 to the inner end of which is secured the disk 5 (shown in perspective in Fig. 3) which constitutes a support for the arms 6. These arms, as shown in Fig. 1, have their inner ends bent substantially at right angles thereto, as at 7, and extend through holes provided therefor in opposite sides of a yoke 8 fitted loosely over the inner end of the spindle $r$, the latter having a collar or flange 9 thereon to support it in the yoke. The arms 6 thus have a pivotal connection with the yoke which permits them to swing in a plane at right angles to the disk or support 5. Any other means of pivoting the arms 6 to the yoke may be employed. The outer ends of the arms 6 are upturned substantially at right angles to the general lengthwise dimension of the arms to receive the weights 10, which are preferably spherical as shown, and preferably these weight-receiving ends of the arm are threaded and the weights screwed thereon, a check-nut 12 being provided to lock the weights in the desired adjusted position thereon. Thus these arms are practically elbow-levers,—one arm of which in their assembled position is at right angles to the plane of rotation thereof.

The arms 6 between the weighted ends thereof and the point of their pivotal connection with the yoke 8 are curved, as shown, whereby each arm may bear on the disk or support 5 at points equi-distant from the axis of said support. Any suitable means may be employed to effect the rotation of the arms 6 with their support 5, as for example the pins 13 may be driven into the disk, as shown in Fig. 3. These pins are not absolutely essential to the proper operation of the device, as the frictional contact alone of the arms with their support will be sufficient to rotate the former, although the use of the pins insures the quicker starting of the arms. When the disk or support 5 and the weighted arms thereon are rotated, the weights 10 being supported one side of the plane of rotation of the main portion of the arms, (that is on that end of the arms 6 which stands at right angles to the plane of rotation thereof,) the centrifugal force to which these weights will be subjected will tend to force the inner ends of the arms and the yoke 8 to which they are pivotally connected outwardly in line with the axis of rotation, and thus impart endwise movement to the spindle $r$, the fulcrum point of the arms 6 being the point of contact of the curved portion thereof with the support 5. Thus the movement of the weights 10 will be always in a direction which will tend to locate them in such position that the line of force, due to the centrifugal action, will become parallel with the plane of rotation of the support 5, and when this point has been reached the yoke 8 will have reached the limit of its outward movement, that is its movement toward the dial $d$. It is therefore clear that the weights 10 will move radially outwardly and downwardly through a curved path when rotary movement is first imparted thereto, and with a constantly decreasing movement. Therefore, at the beginning the effect of this movement of the weights will move the spindle $r$ to a greater degree than when, owing to the increased speed of rotation, the weights are further separated. To compensate for this constantly decreasing endwise movement of the spindle $r$, the arms 6 are given such curvature relative to their support that the fulcrum point, under increasing speeds of rotation, will be shifted constantly further away from the axis of rotation and the leverage of that part of the arm that is attached to the yoke 8 be thus lengthened. In this manner uniformity of movement of the indicating pointer $v$ may be attained which will permit the uniform graduation of the indicating scale 14 on the dial-plate $d$, as the lengthening of the leverage of the arms 6 referred to will increase in proportion as the movement of the weights away from their axis of rotation decreases.

An obvious modification of this construction, whereby the same ends may be obtained, is shown in Figs. 4 and 5, these figures showing the same parts in different positions, in section. This modification consists in making that part of the arms 6 which is attached to the yoke 8, straight and in providing the support 5 with a curved surface 15 whereby, during the rotation of the parts the fulcrum point of the arm on said curved surface will shift in proportion as the weighted ends 10 separate and the leverage will be increased under an increasing speed of rotation. To provide for the easy rotation of the disk or support 5, the hub 4 thereof is provided with ball bearings 16 of which there are two rows one at either end of the sleeve 3, the inwardly tapering ends of this sleeve constituting part of the bearings. Ordinarily the support 5 is rotated by means of a flexible shaft attached to a member 17 secured to the outer end of the hub 4. Of course, it is immaterial whether the support or disk 5 be in the shape of a disk, as shown, or whether it be in the form of a bar extending under the arms 6.

What I claim is:—

1. A speedometer comprising a rotatable support, a vertically movable spindle located axially of said support, and a yoke on the spindle; arms pivotally attached to the yoke in counterbalancing relation and having weights supported thereon, the greater portion of which weights is outside the plane of rotation of said arms, said support constituting a fulcrum for the arms at the point of contact of the latter on said support, the centrifugal action of the weighted ends of the arms serving to effect the shifting of said fulcrum point on the support.

2. A speedometer comprising a rotatable support having a plane surface, a vertically movable spindle located axially of said support, and a yoke on the spindle; arms pivotally attached to the yoke in counterbalancing relation and having weights supported thereon, the greater portion of which weights is outside the plane of rotation of said arms, the arms being curved and bearing at one point on said support, the latter constituting a fulcrum for the arms at the point of contact of the latter on said support, the centrifugal action of the weighted ends of the arms serving to effect the shifting of said fulcrum on the support.

JAMES H. BULLARD.

Witnesses:
 Wm. H. Chapin,
 H. W. Bowen.